United States Patent
John et al.

(10) Patent No.: US 11,910,472 B2
(45) Date of Patent: Feb. 20, 2024

(54) SYSTEMS AND METHODS FOR CELL SELECTION AND RESELECTION BASED ON USER EQUIPMENT ("UE") ACCESS LEVEL

(71) Applicant: Verizon Patent and Licensing Inc., Basking Ridge, NJ (US)

(72) Inventors: Toby Varughese John, Murphy, TX (US); Kodzo Semenyo Agbedanu, Jr., Corinth, TX (US); Bibi M. Hakimzadeh, Fort Worth, TX (US); Christopher Jermaine Sheppard, Carrollton, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 190 days.

(21) Appl. No.: 17/552,049

(22) Filed: Dec. 15, 2021

(65) Prior Publication Data
US 2022/0110188 A1    Apr. 7, 2022

Related U.S. Application Data

(63) Continuation of application No. 16/859,979, filed on Apr. 27, 2020, now Pat. No. 11,234,292.

(51) Int. Cl.
*H04W 76/50*    (2018.01)
*H04W 36/08*    (2009.01)
(Continued)

(52) U.S. Cl.
CPC ........... *H04W 76/50* (2018.02); *H04W 36/08* (2013.01); *H04W 76/30* (2018.02); *H04W 76/40* (2018.02)

(58) Field of Classification Search
CPC ..... H04W 76/50; H04W 36/08; H04W 76/30; H04W 76/40; H04W 36/22; H04W 48/06; H04W 48/12
See application file for complete search history.

(56) References Cited

U.S. PATENT DOCUMENTS

| 2014/0056224 A1* | 2/2014 | Rubin | H04J 11/005 |
| | | | 370/328 |
| 2015/0071157 A1* | 3/2015 | Jung | H04W 48/20 |
| | | | 370/312 |

(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.0.0 (Mar. 2020), Mar. 2020.

(Continued)

*Primary Examiner* — Will W Lin

(57) ABSTRACT

A system described herein may provide a technique for providing high priority access to one or more particular priority cells implemented by a base station of a radio access network ("RAN") associated with a wireless telecommunications network. A first group of User Equipment ("UEs") may be High Priority Access ("HPA") UEs, and a second group of UEs may be non-HPA UEs. In response to triggering events, system broadcast messages and/or Radio Resource Control ("RRC") release messages may be used to cause HPA UEs to connect to the priority cells, and may cause non-HPA UEs to connect to other (e.g., non-priority) cells implemented by the base station.

20 Claims, 14 Drawing Sheets

(51) Int. Cl.
*H04W 76/30* (2018.01)
*H04W 76/40* (2018.01)

(56) References Cited

U.S. PATENT DOCUMENTS

| | | | |
|---|---|---|---|
| 2015/0126147 A1 | 5/2015 | Koskela et al. | |
| 2016/0127969 A1* | 5/2016 | Pao | H04W 36/24 |
| | | | 455/437 |
| 2020/0137816 A1 | 4/2020 | Zhao et al. | |
| 2021/0176674 A1* | 6/2021 | Jung | H04W 36/36 |
| 2021/0297911 A1* | 9/2021 | Jung | H04W 76/30 |
| 2021/0297985 A1 | 9/2021 | Liu et al. | |
| 2022/0086749 A1* | 3/2022 | Ishii | H04W 40/36 |
| 2022/0287036 A1* | 9/2022 | Mildh | H04W 72/56 |
| 2022/0322182 A1* | 10/2022 | Lee | H04W 36/0061 |
| 2022/0394568 A1* | 12/2022 | Teyeb | H04W 48/20 |
| 2023/0107443 A1* | 4/2023 | Da Silva | H04W 36/08 |
| | | | 370/331 |

OTHER PUBLICATIONS

"LTE; Evolved Universal Terrestrial Radio Access (E-UTRA); User Equipment (UE) procedures in idle mode", ETSI TS 136 304 V12.2.0 (Sep. 2014), (3GPP TS 36.304 version 12.2.0 Release 12), Sep. 2014, p. 18.

"Universal Mobile Telecommunications System (UMTS); LTE; Characteristics of the Universal Subscriber Identity Module (USIM) application", ETSI TS 131 102 V14.2.0 (Apr. 2017), (3GPP TS 31.102 version 14.2.0 Release 14), Apr. 2017.

* cited by examiner

```
LTE Radio Resource Control (RRC) protocol                                          901
  BCCH-DL-SCH-Message
    message: c1 (0)
      c1: systemInformation (0)
        systemInformation
          criticalExtensions: systemInformation-r8 (0)
            systemInformation-r8
              sib-TypeAndInfo: 2 items
                Item 0
                  sib-TypeAndInfo item: sib5 (3)
                    sib5
                      interFreqCarrierFreqList: 2 items
                        Item 0
                          InterFreqCarrierFreqInfo
                            dl-CarrierFreq: 2175
                            q-RxLevMin: -140dBm (-70)
                            t-ReselectionEUTRA: 2s
                            threshX-High: 4dB (2)
                            threshX-Low: 0dB (0)
                            allowedMeasCellwidth: mbw6 (0)
           903 ─┐              .... ...0 presenceAntennaPort1: False
                └──             cellReselectionPriorityHPA: 1
                            neighCellConfig: MBSFN subframe allocations of neighbors based on serving cell (2)
                        Item 1
                          InterFreqCarrierFreqInfo
                            dl-CarrierFreq: 66886
                            q-RxLevMin: -140dBm (-70)
                            t-ReselectionEUTRA: 2s
                            threshX-High: 4dB (2)
                            threshX-Low: 0dB (0)
                            allowedMeasCellwidth: mbw6 (0)
           905 ─┐              ..0. ..... presenceAntennaPort1: False
                └──             cellReselectionPriority: 2
                            neighCellConfig: MBSFN subframe allocations of neighbors based on serving cell (2)
                    lateNonCriticalExtension: cc1304c60170e01644
                      SystemInformationBlockType5-v8h0-IEs
                        interFreqCarrierFreqList-v8h0: 2 items
                          Item 0
                            InterFreqCarrierFreqInfo-v8h0
                              multiCellInfoList: 1 item
                                Item 0
                                  FreqCellIndicator: 10
                          Item 1
                            InterFreqCarrierFreqInfo-v8h0
                              multiCellInfoList: 1 item
                                Item 0
                                  FreqCellIndicator: 10
                        nonCriticalExtension
                          interFreqCarrierFreqList-v9e0: 2 items
                            Item 0
                              InterFreqCarrierFreqInfo-v9e0
                                dl-CarrierFreq-v9e0: 67011
                            Item 1
                              InterFreqCarrierFreqInfo-v9e0
                                dl-CarrierFreq-v9e0: 66961
```

```
LTE Radio Resource Control (RRC) protocol
  DL-DCCH-Message
    message: c1
      c1: rrcConnectionRelease
        rrcConnectionRelease
          rrc-TransactionIdentifier: 0
          criticalExtensions: c1
            c1: rrcConnectionRelease-r8
1003          rrcConnectionRelease-r8
                releaseCause: priority-service-redirection
                IdleModeMobilityControlInfo
                  freqPriorityEUTRA: SEQUENCE freqPriorityListEUTRA
                    freqPriorityListEUTRA(1)
1005                  carrierFreq: 2175
                      cellReselectionPriorityHPA: 1
                    freqPriorityListEUTRA(2)
1007                  carrierFreq: 66886
                      cellReselectionPriorityHPA: 2
                    freqPriorityListEUTRA(3)
1009                  carrierFreq: 900
                      cellReselectionPriority: 1
                    freqPriorityListEUTRA(4)
1011                  carrierFreq: 5230
                      cellReselectionPriority: 2
```

FIG. 10

SYSTEMS AND METHODS FOR CELL SELECTION AND RESELECTION BASED ON USER EQUIPMENT ("UE") ACCESS LEVEL

CROSS-REFERENCE TO RELATED APPLICATION

This Application is a Continuation of U.S. patent application Ser. No. 16/859,979 filed on Apr. 27, 2020, titled "SYSTEMS AND METHODS FOR CELL SELECTION AND RESELECTION BASED ON USER EQUIPMENT ("UE") ACCESS LEVEL," the contents of which are herein incorporated by reference in their entirety.

BACKGROUND

Wireless telecommunication networks provide network connectivity to a variety of different users, such as government agencies, first responders, corporate entities, private individuals, etc. Radio frequency ("RF") resources associated with the wireless telecommunications networks (e.g., as provided by base stations of radio access networks ("RANs") associated with the wireless telecommunications networks) may be finite, and congestion or other factors may limit the number of User Equipment ("UE") devices (e.g., mobile phones) that can receive wireless service at a given time.

BRIEF DESCRIPTION OF THE DRAWINGS

FIGS. 8 and 9 illustrate example system broadcast messages, in accordance with some embodiments;

FIG. 10 illustrates an example release message, in accordance with some embodiments;

DETAILED DESCRIPTION OF THE PREFERRED EMBODIMENTS

The following detailed description refers to the accompanying drawings. The same reference numbers in different drawings may identify the same or similar elements.

Embodiments described herein provide for the utilization of certain portions of the RF spectrum, provided by one or more base stations of a RAN of a wireless telecommunications network, by a subset of UEs associated with the wireless telecommunications network. For example, as described herein, some UEs may be associated with "priority" access, while other UEs may not be associated with priority access. UEs associated with priority access may be referred to herein as "High Priority Access ("HPA") UEs," while other UEs (e.g., UEs without priority access) may be referred to simply as "UEs." Generally speaking, for example, HPA UEs may be associated with first responders, governmental entities, and/or other users or organizations for whom access to RF resources may be prioritized. In certain situations, including emergency situations such as natural disasters, terrorist attacks, or other situations, embodiments described herein may provide a dedicated set of RF resources for HPA UEs, to reduce or minimize the likelihood that such HPA UEs are unable to obtain wireless connectivity during such emergency situations. In other words, embodiments provided herein may increase or maximize the availability of RF resources for HPA UEs during such emergency situations.

Figure 1:
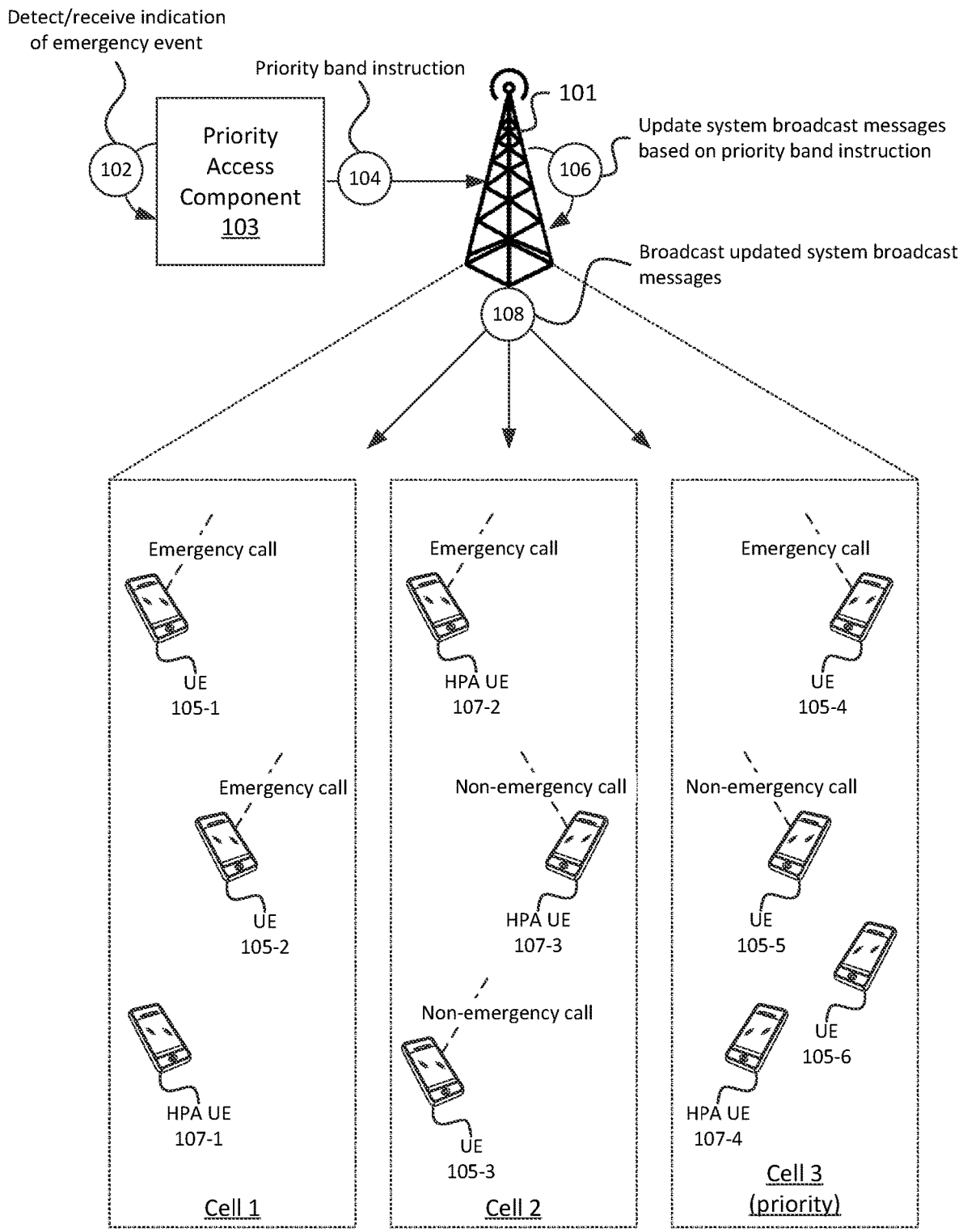
FIG. 1 illustrates an example overview of one or more embodiments described herein, in which a base station, associated with a RAN of a wireless telecommunications network, may update system broadcast messages based on the occurrence of a triggering event.

As shown in FIG. 1, for example, base station 101 may provide wireless access using multiple cells (shown here as Cell 1, Cell 2, and Cell 3). In some embodiments, different cells may implement different frequencies, bands, or carriers. In some embodiments, two different cells may implement the same frequencies, bands, or carriers, and may be provided by two different physical antennas (or two different sets of antennas). Thus, concepts in the context of different "cells" herein may refer to different frequencies, bands, or carriers.

In the example shown in FIG. 1, Cell 3 may be a "priority" cell. For example, as discussed below, in certain situations (e.g., emergency situations), HPA UEs may be directed to connect to base station 101 via Cell 3, in order to maximize the RF resources available to such HPA UEs. In some embodiments, Cell 3 may be associated with greater throughput, lower latency, or other attributes as compared to Cells 1 and/or 2. In some embodiments, by virtue of being available only to HPA UEs in emergency situations, Cell 3 may provide greater performance and/or reliability (e.g., due to lower congestion) than Cells 1 and/or 2 during such emergency situations.

For example, as shown, base station 101 may be communicatively coupled to Priority Access Component ("PAC") 103, which may detect and/or receive (at 102) an indication of a triggering event (e.g., an emergency event). For example, PAC 103 may receive an indication of an emergency event from an external system, such as a governmental emergency alert system. Additionally, or alternatively, PAC 103 may receive information regarding a quantity of emergency calls placed by UEs via base station 101. For example, PAC 103 may receive information from base station 101 and/or one or more elements of a core network, to which base station 101 is communicatively coupled, regarding emergency calls that have been placed within a given timeframe (e.g., within the last ten minutes, within the last hour, within the last day, etc.) via base station 101. Additionally, or alternatively, PAC 103 may detect the emergency event based on one or more measures of congestion and/or load. Such measures of congestion and/or load may include RF resource utilization, such as Physical Resource Block ("PRB") utilization associated with base station 101. As another example measures of congestion and/or load may include a quantity of connections between base station 101 and UEs 105 and/or HPA UEs 107.

As shown, for example, a set of UEs may be involved in ongoing emergency calls via base station 101. In this example, such UEs include UEs 105-1, 105-2, 105-3, and 105-4. An "emergency call" may include a call between a given UE and a Public Safety Answering Point ("PSAP") or other emergency service provider. In some embodiments, an "emergency call" may include a call between a given UE and a designated emergency telephone number, such as "911" or some other designated number. In some embodiments, an "emergency call" may include a call made based on a "highPriorityAccess" establishment cause (e.g., as indicated in a Radio Resource Control ("RRC") Connection Request from UE 105 and/or HPA UE 107 to base station 101). As further shown, one or more UEs may be involved in ongoing non-emergency calls, such as UEs 105-3 and 105-5, and HPA UE 107-3. As further shown, one or more UEs may be "idle," or not engaged in any ongoing calls, such as UE 105-6 and HPA UEs 107-1 and 107-4.

In some embodiments, PAC 103 may detect (at 102) the occurrence of an emergency event based on the quantity or proportion of emergency calls made via base station 101. For example, in this example, PAC 103 may detect that at least a threshold quantity of emergency calls have been made, and/or that at least a threshold proportion of calls made via base station 101 are emergency calls. Based on detecting or determining (at 102) the occurrence of the emergency event, PAC 103 may output (at 104) a priority band instruction to base station 101. Generally speaking, and as described in greater detail below, base station 101 may utilize this instruction to cause one or more UEs 105 and/or HPA UEs 107 to connect to base station 101 via a different cell than the respective cells to which UEs 105 and/or HPA UEs 107 are connected to base station 101.

For example, base station 101 may modify or update (at 106) one or more system broadcast messages. As described below, such system broadcast messages may include System Information Blocks ("SIBs") or other suitable broadcasted information that may be used by UEs 105 and/or HPA UEs 107 to identify and connect to cells associated with base station 101. As further described below, UEs 105 and/or HPA UEs 107, which are currently connected to base station 101, may reselect cells via which they connect to base station 101 based on the updated system broadcast messages. Further, UEs 105 and/or HPA UEs 107, which are not currently connected to base station 101, may select cells via which they initially connect to base station 101 based on the updated system broadcast messages.

Base station 101 may further broadcast (at 108) the updated system broadcast messages. For example, base station 101 may broadcast such updated system broadcast messages in lieu of a previous system broadcast message, which may have included different cell information that did not direct UEs 105 and/or HPA UEs 107 to connect to particular cells. Generally speaking, such updated system broadcast messages may indicate that HPA UEs 107 should connect to base station 101 via one or more cells designated as a "priority" cell (e.g., Cell 3, in this example), and/or may indicate that UEs 105 should connect to base station 101 via one or more cells not designated as a "priority" cell, or designated as a "non-priority" cell (e.g., Cells 1 and/or 2, in this example). As described below, UEs may maintain information indicating whether such UE is a HPA UE, and/or an Access Control Class ("ACC") indicator (where one or more ACCs are associated with high priority access). Such information may be maintained on a Universal Integrated Circuit Card ("UICC"), which may include a data structure in which an ACC is stored (e.g., an ACC Elementary File ("EF")), indicating an ACC of the UE. In accordance with some embodiments, the ACC EF of the UICC (and/or some other suitable data structure maintained by the UE) may store a value (e.g., a binary value, a flag, etc.) that indicates whether the UE is a HPA UE and/or is a non-HPA UE.

Figure 2:
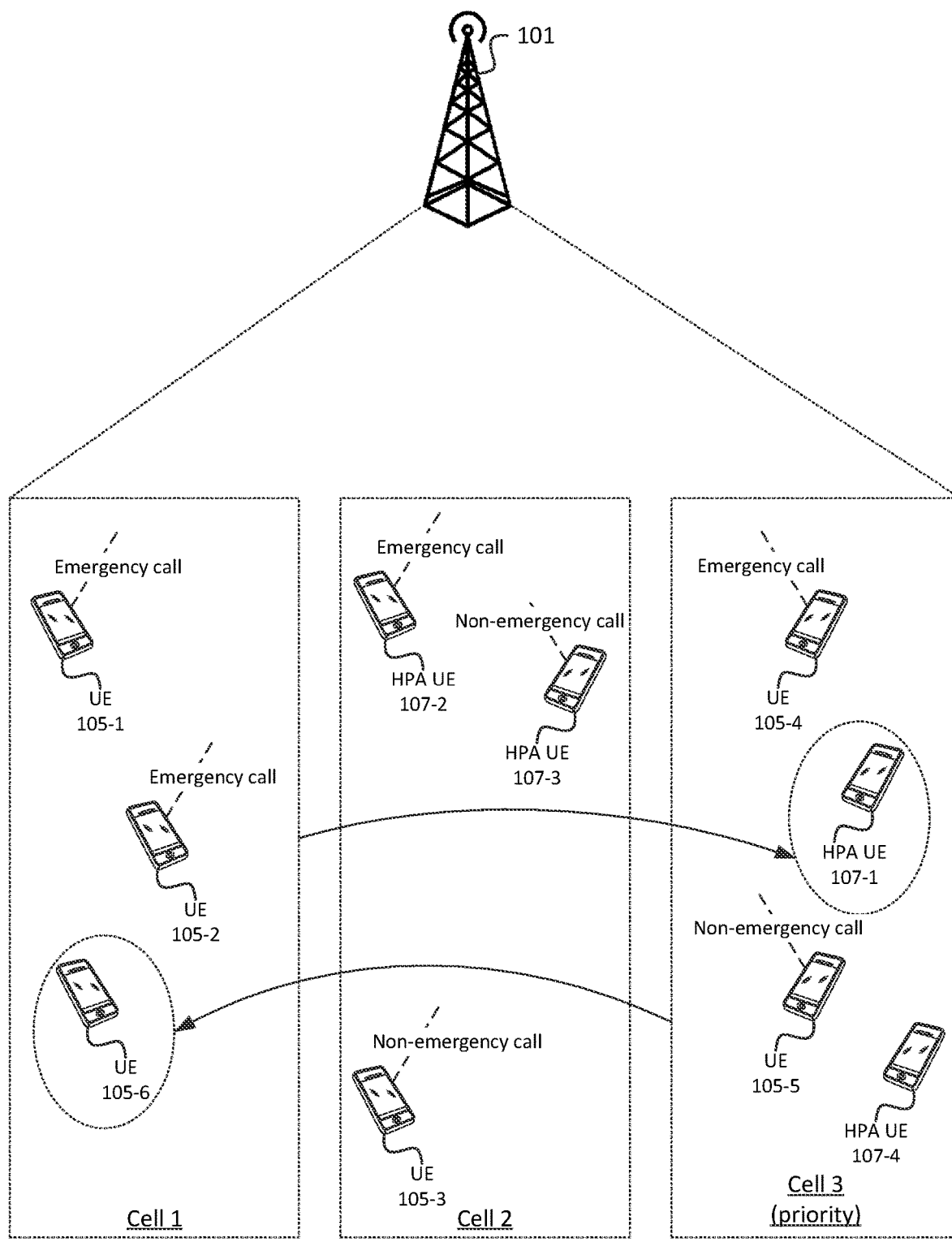
FIG. 2 illustrates an example of cell reselection that may occur in response to an updated system broadcast message, in accordance with some embodiments.

As shown in FIG. 2, for example, UE 105-6, which was previously connected to base station 101 via Cell 3 and was not engaged in an active call, may receive the updated system broadcast message and may, based on the updated information included in the updated system broadcast message, connect to base station 101 via Cell 1. For example, UE 105-6 may initiate a release or reconfiguration of its connection to base station 101 via priority Cell 3 (e.g., using a RRC Reconfiguration Request message), and may request a connection to base station 101 via Cell 1. Further, HPA UE 107-1 may initiate a release or reconfiguration of its connection to base station 101 via Cell 1, and may request a connection to base station 101 via priority Cell 3.

In the example discussed above, UE 105-6 and HPA UE 107-1 may reconfigure their connections to base station 101 (e.g., connect to different cells of base station 101) based on the updated system broadcast information (broadcasted at 108), while other UEs 105 and/or HPA UEs 107 may not reconfigure their connections to base station 101 based on the received update system broadcast information. For example, UEs 105-4 and 105-5 and HPA UE 107-2 may not reconfigure their connections to base station 101, as these UEs are engaged in active calls. That is, in some embodiments, UEs 105 and/or 107 may be configured not to reselect a cell when currently engaged in an active call. In some embodiments, UEs 105 and/or 107 may be configured not to reselect a cell when currently engaged in an active emergency call (e.g., such UEs may determine whether an ongoing call is an emergency call and may reselect or refrain from reselecting a cell accordingly).

As further depicted in FIG. 2, UE 105-5 may be engaged in a non-emergency call via priority cell 3 of base station 101. While in some embodiments, UE 105-5 may not be configured to reconfigure its connection to base station 101 based on updated system broadcast information, in other embodiments, UE 105-5 may be configured to reconfigure its connection to base station 101 based on updated system broadcast information. Thus, while not shown here, UE 105-5 may receive the updated system broadcast information (e.g., indicating that UEs 105 should connect to base station 101 via one or more cells not designated as a "priority" cell) and may interrupt the active non-emergency call to connect to a non-priority cell (e.g., Cell 1 or Cell 2). In some embodiments, interrupting the call may include ending or disconnecting the call, requesting (to base station 101) that the call be handed over to a non-priority cell, and/or otherwise causing UE 105-5 to connect to a different cell before the call has ended.

Similarly, HPA UE 107-2 is shown here as being engaged in an active call (e.g., an emergency call) via a non-priority cell (e.g., Cell 2). HPA UE 107-2 may refrain from reconnecting to base station 101 via priority cell 3, in order to avoid disconnecting or interrupting the active emergency call. Further still, HPA UE 107-3 is shown here as being engaged in an active call (e.g., a non-emergency call) via a non-priority cell (e.g., Cell 2). In some embodiments, HPA UE 107-2 may refrain from reconnecting to base station 101 via priority cell 3 in order to avoid disconnecting or interrupting the active non-emergency call. On the other hand, while not shown here, HPA UE 107-2 may, in some embodiments, determine that the call is a non-emergency call and may accordingly disconnect or interrupt the call (based on determining that the call is a non-emergency call) to reconnect to base station 101 via priority Cell 3.

Figure 3:
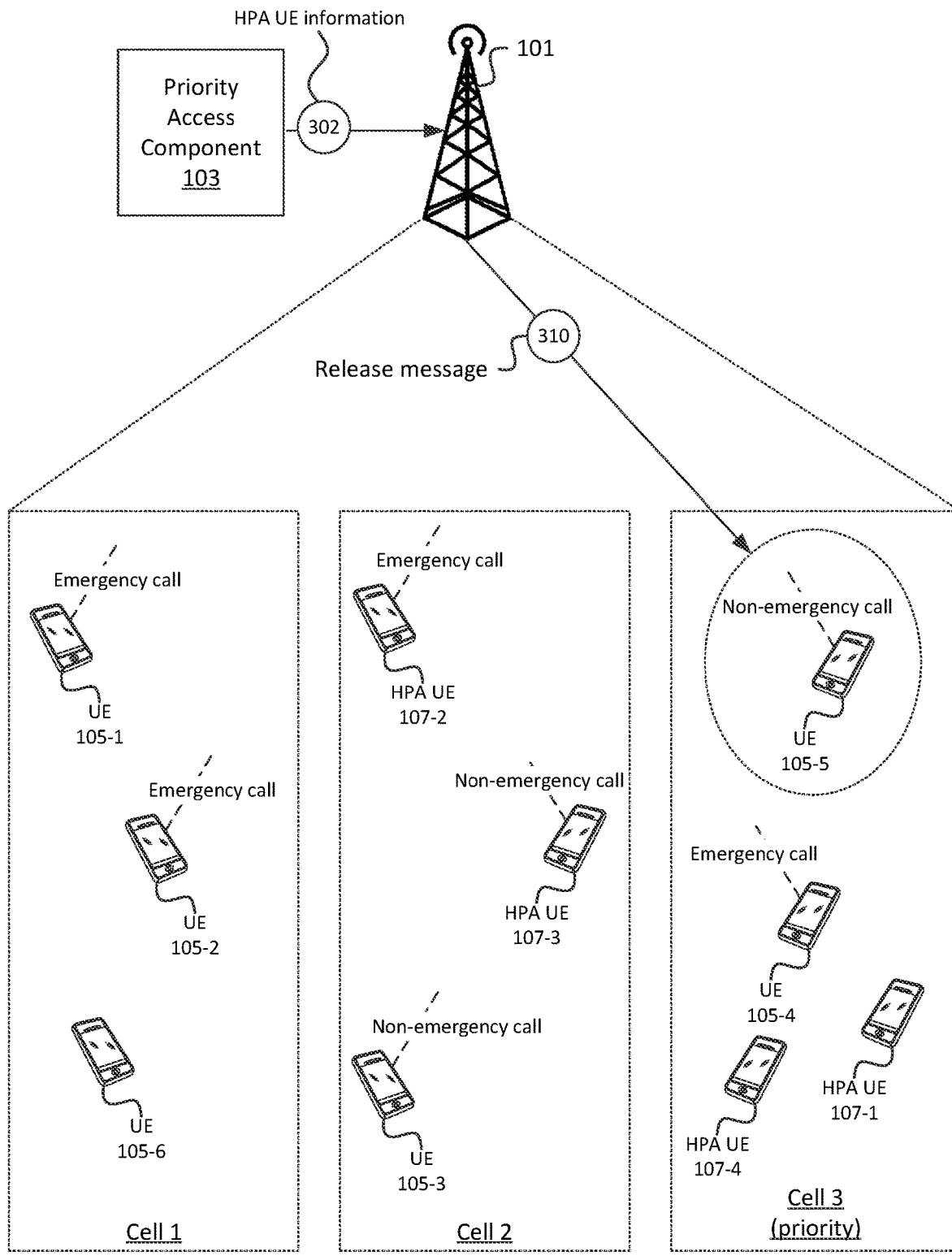
FIGS. 3 and 4 illustrate an example scenario in which a particular UE, engaged in an active call, may be released from a first cell associated with a particular base station based on a detected occurrence of a triggering event, and may reconnect to the base station via a second cell.

In some embodiments, as shown in FIG. 3, base station 101 may actively cause one or more UEs 105 to be disconnected from a priority cell when an emergency event is detected. For example, base station 101 may receive (at 302) information regarding a set of HPA UEs 107 from PAC 103. Such information may include identifiers, such as International Mobile Subscriber Identity ("IMSI") values, International Mobile Station Equipment Identity ("IMEI") values, Mobile Directory Numbers ("MDNs"), Globally Unique Temporary Identifiers ("GUTIs"), Subscription Permanent Identifiers ("SUPIs"), and/or other suitable identifiers associated with HPA UEs 107. Additionally, or alternatively, such information provided (at 302) by PAC 103 may include identifying information for one or more UEs 105 (e.g., non-HPA UEs).

In some embodiments, PAC 103 may be communicatively coupled to one or more devices of a wireless telecommunications network, which generate or maintain information that indicates which UEs are HPA UEs 107 and/or are non-HPA UEs 105. For example, PAC 103 may receive such information from a Home Subscriber Server ("HSS"), Unified Data Management function ("UDM"), or other suitable device or system. In some embodiments, base station 101 may receive this information from a HSS or UDM, instead of from PAC 103.

In some embodiments, PAC 103 may provide (at 302) this information to base station 101 on a basis that is independent of PAC 103 providing (at 104) a priority band instruction to base station 101. For example, PAC 103 may provide (at 302) such information to base station 101 prior to indicating (at 104) that an emergency event has occurred. Additionally, or alternatively, PAC 103 may provide (at 302) the HPA UE information concurrently with providing (at 104) the indication that the emergency event has occurred. In some embodiments, PAC 103 may provide (at 302) the HPA UE information after providing (at 104) the indication that the emergency event has occurred (e.g., may provide (at 302) the HPA UE information based on determining (at 102) that the emergency event has occurred). In some embodiments, in addition to, or in lieu of, PAC 103 providing (at 302) HPA UE information to base station 101, base station 101 may provide (not shown) information to PAC 103, indicating identifiers of UEs that are presently connected to base station 101, along with an indication of the cells to which such UEs are connected.

In this example, PAC 103 and/or base station 101 may determine that UE 105-5 is connected to base station 101 via priority Cell 3. In this scenario, UE 105-5 may not have initiated a cell reselection procedure due to being engaged in an ongoing call. PAC 103 and/or base station 101 may determine that the ongoing call associated with UE 105-5 is a non-emergency call (e.g., is a call that does not involve a PSAP and/or a particular emergency number), that UE 105-5 is not a HPA UE 107 (e.g., based on the information received (at 302) from PAC 103), and further that an emergency event has been detected (at 102). Based on determining that UE 105-5 is not engaged in an emergency call, that UE 105-5 is not a HPA UE 107, and that an emergency event has been detected, base station 101 may cause UE 105-5 to disconnect from priority Cell 3. For example, as shown, base station 101 may output (at 310) a Release message to UE 105-5, which may cause the ongoing call to be interrupted or terminated.

Figure 4:
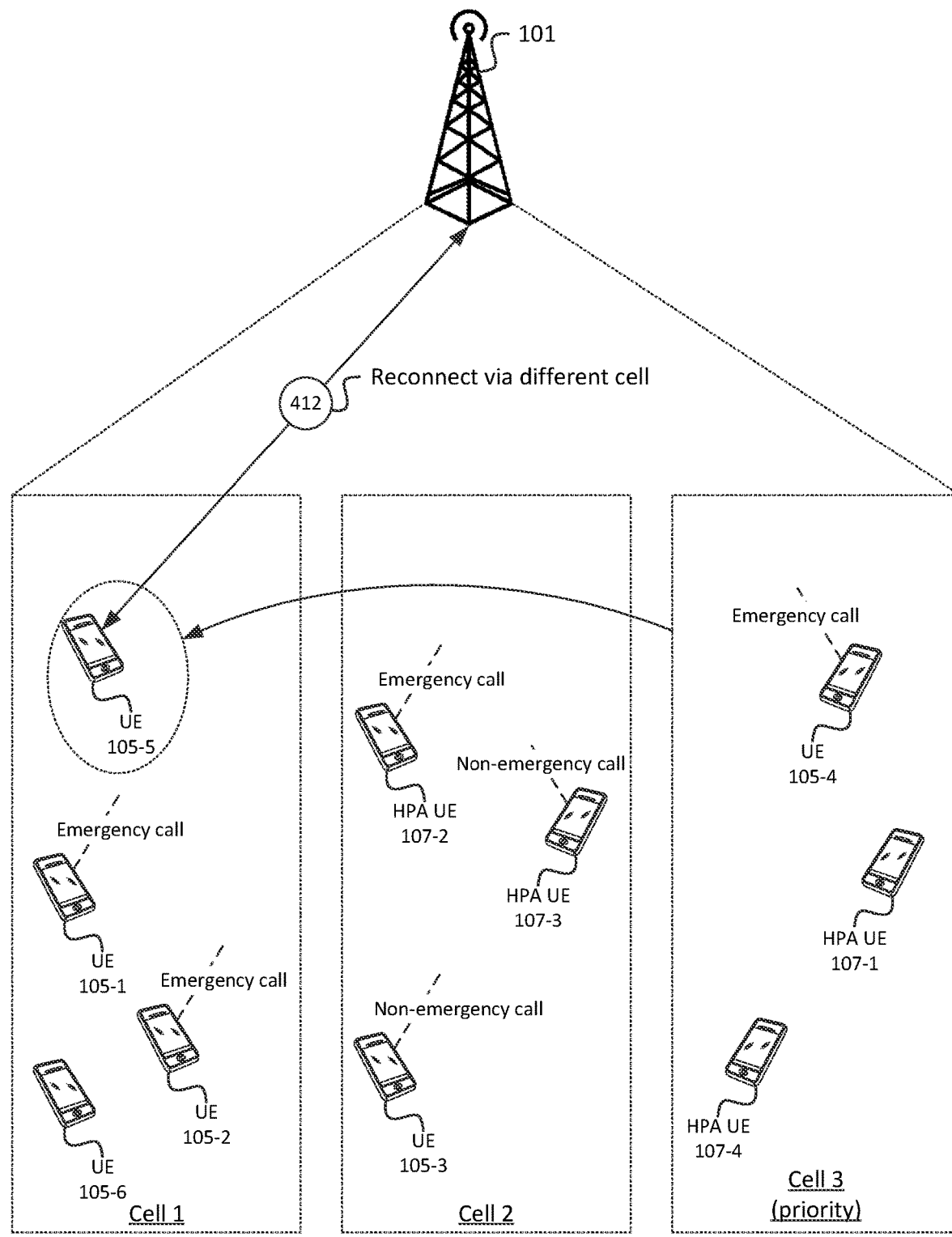

As shown in FIG. 4, UE 105-5 may reconnect to base station 101 via another cell (e.g., Cell 1), which is not designated as a priority cell. In some embodiments, base station 101 and UE 105-5 may perform a handover procedure to transfer the call from Cell 3 to Cell 1. For example, while not discussed in detail here, base station 101 and/or UE 105-5 may maintain a context associated with the active call, modify the context based on the release of UE 105-5 from Cell 3 and the reconnection of UE 105-5 to base station 101 via Cell 1, and resume the call using the modified context.

Returning to FIG. 3, although UE 105-4 is not a HPA UE 107, the active call associated with UE 105-4 may be allowed to continue via priority Cell 3, even though an emergency event has been indicated (at 104). For example, PAC 103 and/or base station 101 may determine that the active call is an emergency call (e.g., is a call between UE 105-4 and a PSAP, a particular emergency telephone number, etc.), and may therefore forgo releasing the connection between UE 105-4 and base station 101.

As further shown in FIG. 3, HPA UEs 107-2 and 107-3 may be engaged in calls via Cell 2 (e.g., a non-priority cell). Specifically, HPA UE 107-2 may be engaged in an emergency call, while HPA UE 107-3 may be engaged in a non-emergency call. In some embodiments, PAC 103 and/or base station 101 may refrain from releasing any connection associated with a HPA UE 107, regardless of which cell HPA UE 107 is connected to, and/or regardless of which type of call HPA UE 107 is engaged in. Additionally, or alternatively, while not shown here, PAC 103 and/or base station 101 may be configured to release HPA UE 107-3, which is connected to a non-priority cell, and is engaged in a non-emergency call when an emergency event has been detected.

Figure 5:
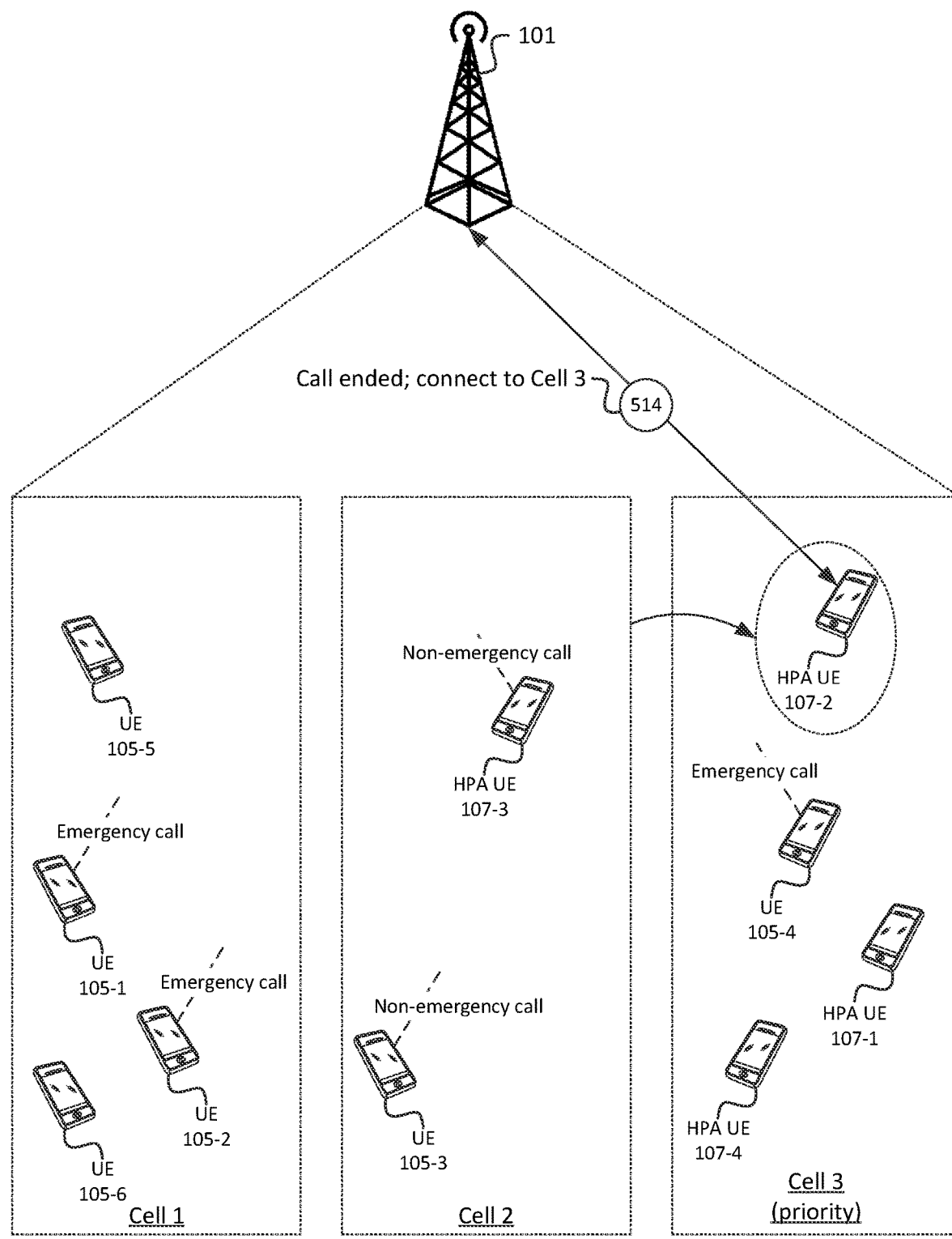
FIGS. 5 and 6 illustrate example scenarios in which UEs may reselect a particular cell, associated with a particular base station, based on an updated system broadcast message broadcasted by the base station.

As shown in FIG. 5, once the active call, in which HPA UE 107-2 is engaged, ends, HPA UE 107-2 may connect (at 514) to priority Cell 3. For example, as noted above, HPA UE 107-2 may receive the modified system broadcast message (outputted at 108) and may perform a cell reselection procedure based on the modified system broadcast message. As noted above, the modified system broadcast message may indicate that HPA UEs 107 (e.g., UEs that maintain information indicating that such UEs are HPA UEs 107, such as UICC information) should connect to base station 101 via a particular cell (e.g., priority Cell 3). Based on HPA UE 107-2 no longer being engaged in an active call, and further based on the updated system broadcast message (outputted at 108), HPA UE 107-2 may perform a reconfiguration procedure with base station 101 (e.g., may output a RRC Reconfiguration Request message to base station 101) to connect to base station 101 via Cell 3 instead of via Cell 2.

Additionally, or alternatively, once the call ends, base station 101 may determine that the call has ended, and may send a release message or some other type of RRC message to HPA UE 107-2. This message may indicate that base station 101 should perform a cell reselection procedure. As described below, the release message may indicate that since HPA UE 107-2 is a HPA UE, HPA UE 107-2 should connect to a priority cell (e.g., Cell 3) instead of to a non-priority cell (e.g., Cells 1 and/or 2).

Figure 6:
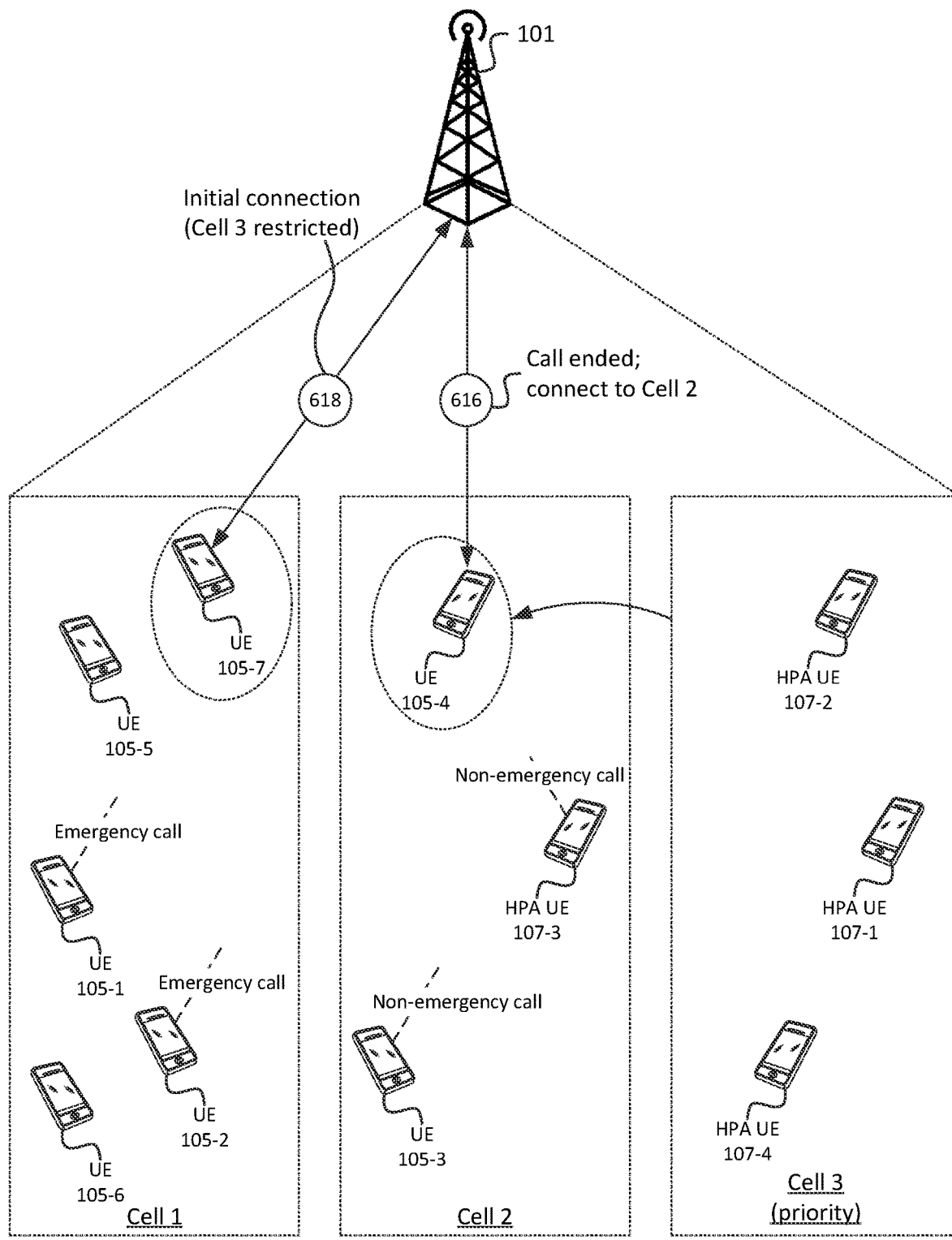

Similarly, as shown in FIG. 6, once the emergency call, in which UE 105-4 is engaged, has ended, UE 105-4 may reconfigure its connection to base station 101 to connect (at 616) to base station 101 via Cell 2, rather than priority Cell 3. For example, UE 105-4 may determine, based on the updated system broadcast message (outputted at 108) that UE 105-4 is not a HPA UE 107, and therefore should not connect to base station 101 via Cell 3. As further shown in FIG. 6, UE 105-7, which may not have previously connected to base station 101, may connect (at 618) to base station 101 via Cell 1. For example, UE 105-7 may receive the updated system broadcast message, indicating that Cell 3 is designated as a priority cell for HPA UEs 107, and may determine that UE 105-7 is therefore restricted from connecting to base station 101 via Cell 3. For example, as similarly discussed above, UE 105-7 may determine that an ACC EF, stored by a UICC associated with UE 105-7, indicates that UE 105-7 is not a HPA UE 107 (and/or does not indicate that UE 105-7 is a HPA UE 107). Additionally, or alternatively, in the event that UE 105-7 attempts to connect to base station 101 via Cell 3, base station 101 may reject such connection attempt based on information (e.g., as provided by PAC 103 at 302) indicating that UE 105-7 is not a HPA UE 107.

Figure 7:
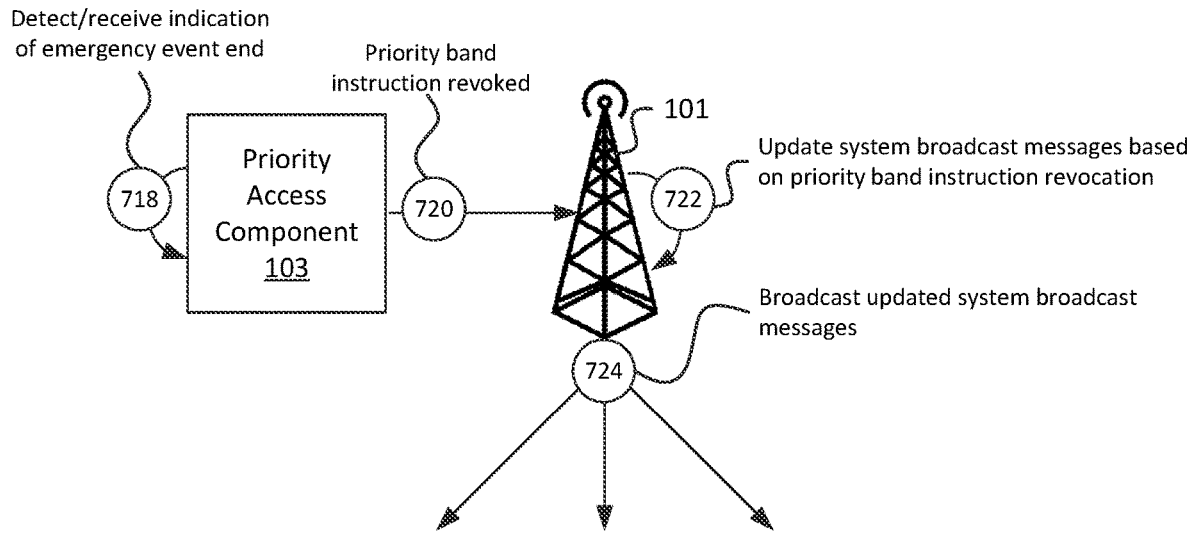
FIG. 7 illustrates an example scenario in which a base station may update system broadcast messages based on detecting that a triggering event has ended and/or that triggering criteria are no longer satisfied.

As shown in FIG. 7, PAC 103 may at some point detect (at 718), and/or may receive an indication, that the emergency event has ended. For example, PAC 103 may, in some embodiments, determine that a quantity of emergency calls placed via base station 101 has fallen below a threshold value, and/or that a proportion of emergency calls to non-emergency calls placed via base station 101 has fallen below a threshold value. Additionally, or alternatively, PAC 103 may determine that a quantity of calls over a particular time window, involving HPA UEs 107, has fallen below a threshold quantity. Additionally, or alternatively, PAC 103 may determine that a quantity of active calls associated with one or more priority cells (e.g., Cell 3, in the examples provided above) has fallen below a threshold quantity. As another example, PAC 103 may receive an indication from a same or different source that initially indicated (at 102) the occurrence of the emergency event. In some embodiments, PAC 103 may automatically determine that the emergency event has ended. For example, PAC 103 may determine that the emergency event has ended after a predetermined amount of time.

Based on determining (at 718) that the emergency event has ended, PAC 103 may provide (at 720) a revocation of the priority band instruction. For example, this revocation may be a revocation of the priority band previously provided (at 104) by PAC 103. Based on receiving the revocation, base station 101 may update (at 722) system broadcast messages. For example, base station 101 may revert an update made (at 106) in response to the previous priority band instruction, based on the detection of the emergency event. In some embodiments, the update (at 722) to the system broadcast messages may allow UEs 105 to connect to base station 101 via cells previously designated as priority cells. For example, UEs 105 may use the system broadcast messages to identify and connect to such cells. Further, base station 101 may allow (e.g., not reject) connections requested by UEs 105 (e.g., non-HPA UEs) via cells previously designated as priority cells.

Figure 8:
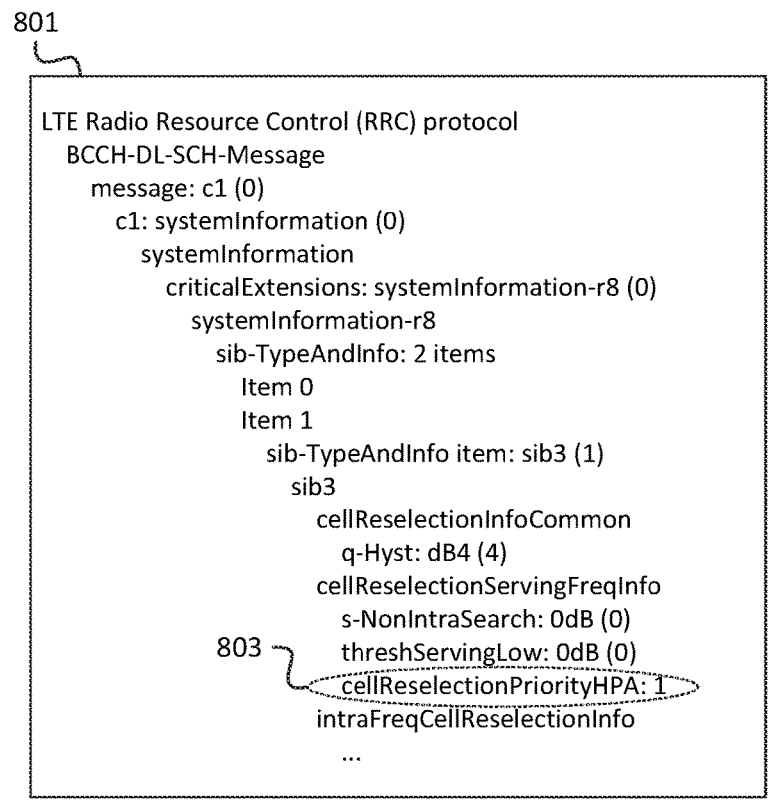

FIGS. 8 and 9 illustrate example system broadcast messages, in accordance with some embodiments. For example, SIB 801, shown in FIG. 8, is an example SIB 3 message in accordance with some embodiments. SIB 801 may, in some embodiments, be an intra-frequency message, and may be associated with a particular cell associated with base station 101. For example, base station 101 may broadcast SIB 801 via a priority cell (e.g., Cell 3 in the examples provided above). SIB 801 may include Information Element ("IE") 803 (shown in the figure as "cellReselectionPriorityHPA"), indicating a priority level associated with the particular cell. In this example, HPA UEs 107 may, based on IE 803, connect to the priority cell associated with SIB 801, and/or may remain connected to the priority cell associated with SIB 801. Further, UEs 105 (e.g., non-HPA UEs), which are connected to the priority cell associated with SIB 801, may determine that the "cellReselectionPriorityHPA" IE is not associated with non-HPA UEs, and may therefore refrain from connecting to base station 101 via this cell. Further, UEs 105 that are connected to this cell (e.g., UEs 105 that are in "idle" mode) may perform a cell reselection procedure in order to connect to a different cell associated with base station 101.

SIB 901, shown in FIG. 9, is an example SIB 5 in accordance with some embodiments. SIB 901 may, in some embodiments, be an inter-frequency neighbor cell message. SIB 901 may include IEs 903 and 905, which may include cell priority information for multiple cells associated with base station 101. For example, IE 903 ("cellReselectionPriorityHPA: 1") may be associated with a priority cell of base station 101, while IE 905 ("cellReselectionPriority: 2") may be associated with a non-priority cell of base station 101. When receiving SIB 901, HPA UE 107 may include cells indicated as priority cells (e.g., associated with IE 903) when performing a cell selection or reselection procedure, and may therefore connect to a priority cell associated with base station 101. On the other hand, when receiving SIB 901, UE 105 (e.g., a non-HPA UE) may refrain from including cells indicated as priority cells when performing a cell selection or reselection procedure, and may therefore not connect to a priority cell associated with base station 101. Instead, UE 105 may connect to a cell associated with IE 905.

While two example types of SIBs (e.g., an example SIB 3 and an example SIB 5) are discussed above, in some embodiments, other types of SIBs may be used to similarly indicate which cells are priority bands. For example, similar concepts may apply to SIB 4 (Intra-Frequency Neighbor Cell), SIB 6 (Universal Mobile Telecommunications Service ("UMTS") Terrestrial Radio Access Network ("UTRAN") Neighbor Cell), SIB 7 (Global System for Mobile Communications ("GSM") Enhanced Data rates for GSM Evolution ("EDGE") RAN ("GERAN") Neighbor Cell), SIB 8 (Code Division Multiple Access ("CDMA") Neighbor Cell), SIB 24 (New Radio ("NR") Neighbor Cell), or other suitable types of SIBs or other system broadcast messages.

FIG. 10 illustrates an example release message 1001, in accordance with some embodiments. Release message 1001 may correspond to, for example, a release message sent (e.g., at 310) to UE 105 (e.g., a non-HPA UE). Release message 1001 may, for example, cause UE 105 to disconnect from base station 101 via a priority cell. In some embodiments, the information included in release message 1001 may also include information that causes UE 105 to reconnect to base station 101 via a different (e.g., non-priority) cell, and/or that allows UE 105 to identify and reconnect to base station 101 via a different cell.

For example, as shown, release message 1001 may include IE 1003 ("releaseCause"), indicating that the reason that UE 105 was released was "priority-service-redirection." Release message 1001 may also include IEs 1005 and 1007, which may be associated with example priority cells associated with base station 101. In this example, two different cells (implementing two different frequency bands) associated with base station 101 may be priority cells, and cell having the priority of 1 (e.g., associated with IE 1005, "cellReselectionPriorityHPA: 1") may be indicated as a higher priority cell. Further, release message 1001 may include IEs 1009 and 1011, which may be associated with non-priority cells associated with base station 101.

UEs 105, which receive release message 1001, may forgo reselecting cells indicated as priority cells (e.g., associated with IEs 1005 and 1007 in this example, which are "cellReselectionPriorityHPA" IEs), and may instead reselect a cell based on IEs 1009 and/or 1011 (e.g., which are "cellReselectionPriority" IEs). On the other hand, in situations where HPA UE 107 has received release message 1001 (e.g., where HPA UE 107 is released, either while in "idle" mode or during an active call), HPA UE 107 may reselect a cell based on IEs 1005 and/or 1007. In some embodiments, HPA UE 107 may further include IEs 1009 and/or 1011 when performing a cell reselection procedure. For example, if priority cells associated with IEs 1005 and/or 1007 are not suitable for some reason (e.g., HPA UE 107 is out of range of the priority cells, connection metrics associated with the priority cells and HPA UE 107 are below threshold metrics, the priority cells are congested, or some other reason), then HPA UE 107 may attempt to connect to base station 101 via a non-priority cell.

Figure 11:
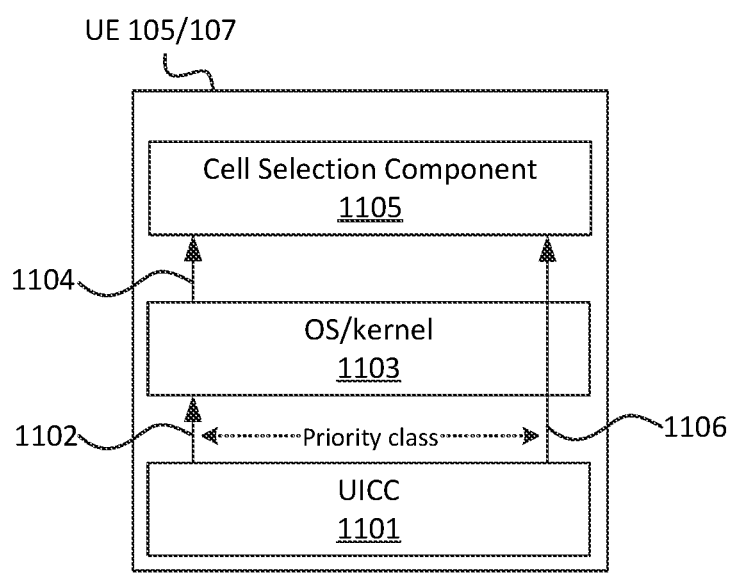
FIG. 11 illustrates an example arrangement of functional components associated with a UE, which may include elements that indicate priority information associated with the UE.

FIG. 11 illustrates an example arrangement of functional components associated with a UE (e.g., UE 105 and/or HPA UE 107, referred to herein as "UE 105/107"), which may include elements that indicate priority information associated with the UE. For example, UE 105/107 may include such as UICC 1101, operating system ("OS")/kernel 1103, and cell selection component 1105. As similarly discussed above, UICC 1101 may receive and store priority class information for UE 105/107, such as in an ACC EF portion of UICC 1101. In some embodiments, priority class information may be provided to UICC 1101 when UE 105/107 is purchased, provisioned with a network, etc. Additionally, or alternatively, the priority information may be provided to UICC 1101 at some other time (e.g., after UE 105/107 has been initially provisioned with the network, such as via an over-the-air ("OTA") update or through some other suitable process).

In some embodiments, OS/kernel 1103 of UE 105/107 may obtain (at 1102) the priority class information from UICC 1101. For example, OS/kernel 1103 may read the contents of UICC 1101 to determine the priority class information. In some embodiments, OS/kernel 1103 may store the priority class (e.g., as a global system variable). Cell selection component 1105 may obtain (at 1104) the priority class information from OS/kernel 1103 (e.g., via an application programming interface ("API") or some other suitable communication pathway). Additionally, or alternatively, cell selection component 1105 may read (at 1106) UICC 1101 directly.

Once cell selection component 1105 obtains the priority class information for UE 105/107, cell selection component 1105 may cause UE 105/107 to select a cell (e.g., associated with base station 101) according to the priority class associated with UE 105/107 (e.g., whether UE 105/107 is a HPA UE or a non-HPA UE). Cell selection component 1105 may further select a cell of base station 101 based on system broadcast messages (e.g., SIBs received from base station 101, such as example SIBs 801 and 901 discussed above) and/or RRC messages received from base station 101 (e.g., release message 1101 discussed above). In some embodiments, when cell selection component 1105 receives an RRC message (e.g., release message 1001) and one or more SIBs, UE 105/107 may use the information provided in the RRC message to select a cell of base station 101 to which UE 105/107 connects. In other words, in some embodiments, RRC messages (e.g., release message 1001) may control in situations where conflicting or different information is presented via RRC messages and system broadcast messages.

Figure 12:
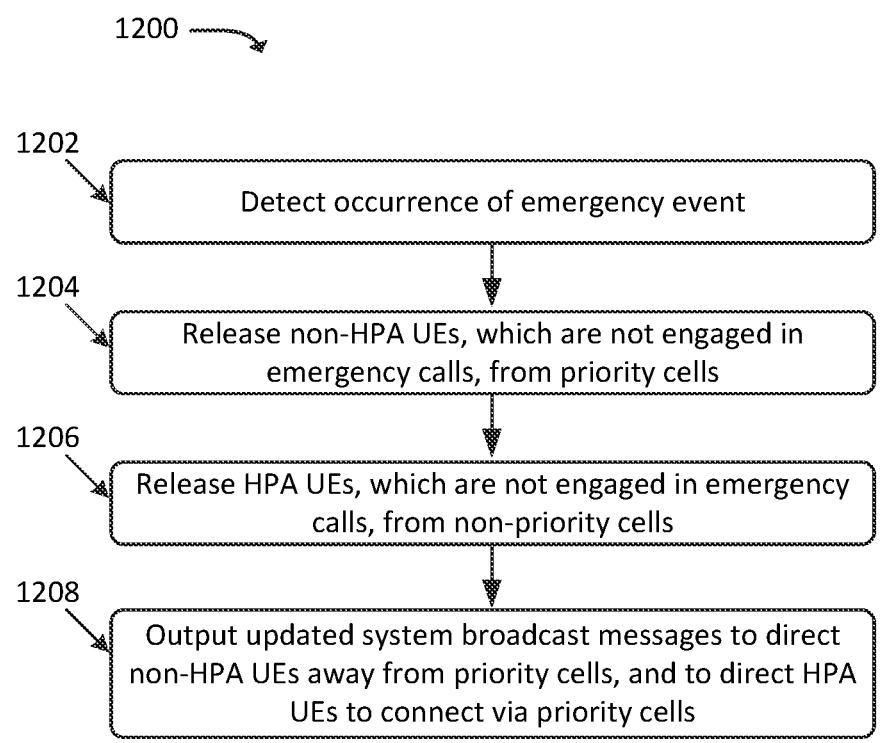
FIG. 12 illustrates an example process for causing UEs to reselect cells associated with base station based on detecting a triggering event.

FIG. 12 illustrates an example process 1200 for causing UEs 105 and/or HPA UEs 107 to reselect cells associated with base station 101 based on detecting an emergency event. In some embodiments, some or all of process 1200 may be performed by PAC 103. In some embodiments, one or more other devices may perform some or all of process 1200 in concert with, and/or in lieu of, PAC 103. For example, some or all of process 1200 may be performed by, or in concert with, base station 101.

As shown, process 1200 may include detecting (at 1202) an occurrence of an emergency event. For example, PAC 103 may detect the emergency event based on a quantity of emergency calls made via base station 101, congestion and/or load metrics associated with base station 101, indications of emergency events from other systems, and/or other suitable factors.

Process 1200 may further include releasing (at 1204) non-HPA UEs 105, which are not engaged in emergency calls, from priority cells. For example, PAC 103 may instruct base station 101 to send RRC messages to UEs 105, which are connected to base station 101 via cells designated as priority cells, to release their connections with base station 101. As discussed above, such release messages may indicate one or more cells of base station 101 which are non-priority cells, which UE 105 may use to reconnect to base station 101 via a non-priority cell. As further discussed above, the release messages may be sent while UE 105 is engaged in an active call via a priority cell, which may cause the call to be interrupted, ended, or transferred. In some embodiments, the release messages may be sent to UE 105 while UE 105 is not engaged in an active call, which may cause UE 105 to perform a cell reselection procedure when receiving the release message.

Process 1200 may further include releasing (at 1206) HPA UEs 107, which are not engaged in emergency calls, from non-priority cells. For example, PAC 103 may instruct base station 101 to send RRC messages to UEs 107, which are connected to base station 101 via cells designated as non-priority cells (or cells not designated as priority cells), to release their connections with base station 101. As discussed above, such release messages may indicate one or more cells of base station 101 which are priority cells, which HPA UE 107 may use to reconnect to base station 101 via a priority cell. In some embodiments, the release messages may be sent while HPA UE 107 is engaged in an active call via a non-priority cell, which may cause the call to be interrupted, ended, or transferred. In some embodiments, the release messages may be sent to HPA UE 107 while HPA UE 107 is not engaged in an active call, which may cause HPA UE 107 to perform a cell reselection procedure when receiving the release message. In some embodiments, if HPA UE 107 is engaged in an active call (e.g., an emergency or a non-emergency call), PAC 103 may wait until the call is complete before issuing the release message to HPA UE 107. For example, based on determining that HPA UE 107 is a HPA UE, PAC 103 may refrain from disconnecting or interrupting any active calls associated with HPA UE 107 for the purposes of cell reselection.

Process 1200 may additionally include outputting (at 1208) one or more updated system broadcast messages. For example, as discussed above, such system broadcast messages may include one or more SIBs, which may direct UEs 105 away from connecting to base station 101 via priority cells, and may further direct HPA UEs 107 to connect to base station 101 via priority cells.

Figure 13:
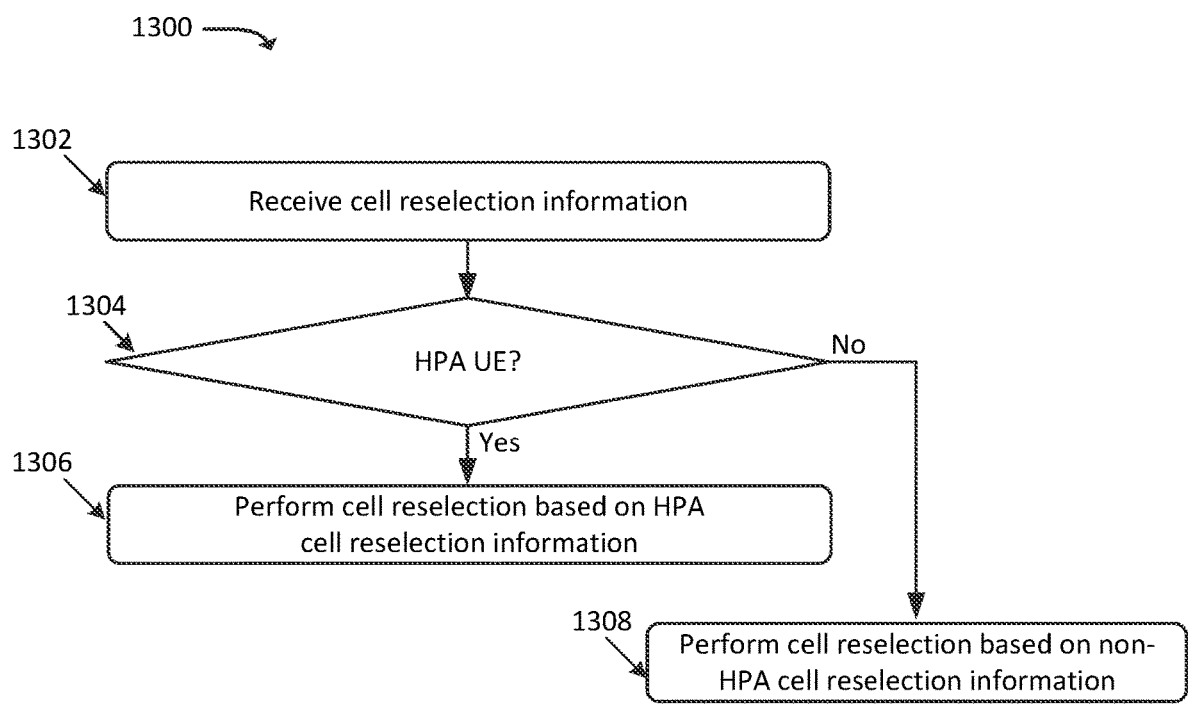
FIG. 13 illustrates an example process for performing cell reselection based on information received via a base station.

FIG. 13 illustrates an example process 1300 for performing cell reselection based on information received from PAC 103 and/or base station 101. In some embodiments, some or all of process 1300 may be performed by UE 105/107.

As shown, process 1300 may include receiving (at 1302) cell reselection information. For example, as discussed above, such cell reselection information may be received via system broadcast messages (e.g., SIBs) and/or RRC messages (e.g., release messages).

Process 1300 may further include determining (at 1304) whether UE 105/107 is a HPA UE. For example, as discussed above, UE 105/107 may maintain such information in an ACC EF associated with a UICC associated with UE 105/107.

If UE 105/107 is a HPA UE (at 1304—YES), then process 1300 may additionally include performing (at 1306) a cell reselection procedure based on HPA cell reselection information. For example, as discussed above with respect to SIB 801, SIB 901, and release message 1001, HPA UE 107 may identify one or more cells indicated as priority cells, and may connect to base station 101 via a particular priority cell.

If, on the other hand, UE 105/107 is not a HPA UE (at 1304—NO), then process 1300 may also include performing (at 1308) a cell reselection procedure based on non-HPA cell reselection information. For example, as discussed above with respect to SIB 801, SIB 901, and release message 1001, UE 105 may identify one or more cells indicated as non-priority cells (or not indicated as priority cells), and may connect to base station 101 via a particular non-priority cell.

Figure 14:
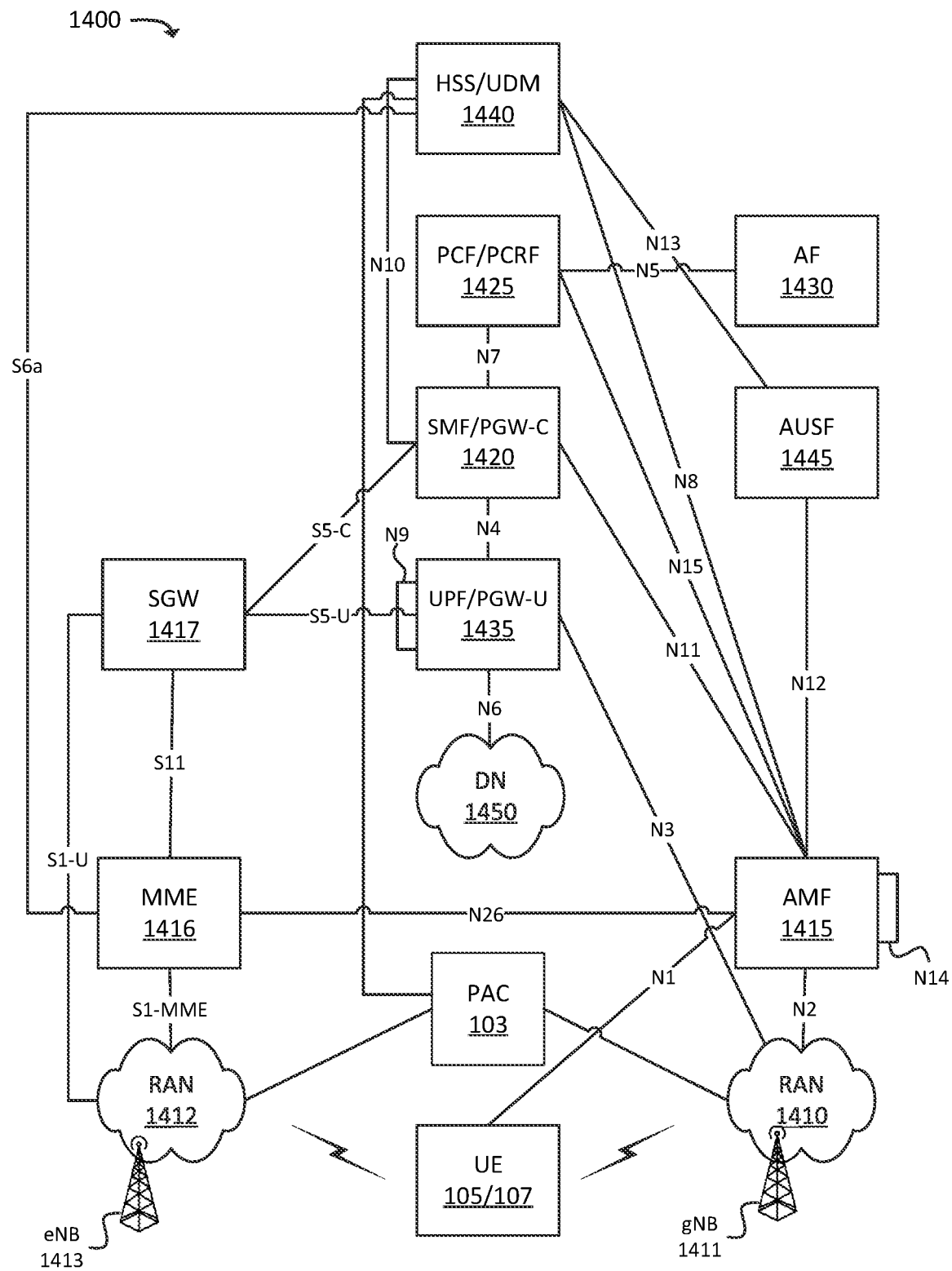
FIG. 14 illustrates an example environment in which one or more embodiments, described herein, may be implemented.

FIG. 14 illustrates an example environment 1400, in which one or more embodiments may be implemented. In some embodiments, environment 1400 may correspond to a Fifth Generation ("5G") network, and/or may include elements of a 5G network. In some embodiments, environment 1400 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1400 may include UE 105/107, radio access network ("RAN") 1410 (which may include one or more Next Generation Node Bs ("gNBs") 1411), RAN 1412 (which may include one or more one or more evolved Node Bs ("eNBs") 1413), PAC 103, Access and Mobility Management Function ("AMF") 1415, Mobility Management Entity ("MME") 1416, Serving Gateway ("SGW") 1417, Session Management Function ("SMF")/Packet Data Network ("PDN") Gateway ("PGW")-Control plane function ("PGW-C") 1420, Policy Control Function ("PCF")/Policy Charging and Rules Function ("PCRF") 1425, Application Function ("AF") 1430, User Plane Function ("UPF")/PGW-User plane function ("PGW-U") 1435, Home Subscriber Server ("HSS")/Unified Data Management ("UDM") 1440, Authentication Server Function ("AUSF") 1445, and Data Network ("DN") 1450.

The quantity of devices and/or networks, illustrated in FIG. 14, is provided for explanatory purposes only. In practice, environment 1400 may include additional devices and/or networks, fewer devices and/or networks, different devices and/or networks, or differently arranged devices and/or networks than illustrated in FIG. 14. For example, while not shown, environment 1400 may include devices that facilitate or enable communication between various components shown in environment 1400, such as routers, modems, gateways, switches, hubs, etc. Alternatively, or additionally, one or more of the devices of environment 1400 may perform one or more functions described as being performed by another one or more of the devices of environment 1400. Devices of environment 1400 may interconnect with each other and/or other devices via wired connections, wireless connections, or a combination of wired and wireless connections. In some implementations, one or more devices of environment 1400 may be physically integrated in, and/or may be physically attached to, one or more other devices of environment 1400.

UE 105/107 may include a computation and communication device, such as a wireless mobile communication device that is capable of communicating with RAN 1410 and/or DN 1450. UE 105/107 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, an Internet of Things ("IoT") device, a Mobile-to-Mobile ("M2M") device, or another type of mobile computation and communication device. UE 105/107 may send traffic to and/or receive traffic (e.g., user plane traffic) from DN 1450 via RAN 1410 and UPF/PGW-U 1435. As discussed above, UE 105/107 may maintain information indicating whether UE 105/107 is a HPA UE 107, and may connect to cells associated with RANs 1410 and/or 1412 in accordance with embodiments described above.

RAN 1410 may be, or may include, a 5G RAN that includes one or more base stations (e.g., one or more gNBs 1411), via which UE 105/107 may communicate with one or more other elements of environment 1400. In some embodiments, gNB 1411 may be an instance of base station 101. UE 105/107 may communicate with RAN 1410 via an air interface (e.g., as provided by gNB 1411). For instance, RAN 1410 may receive traffic (e.g., voice call traffic, data traffic, messaging traffic, signaling traffic, etc.) from UE 105/107 via the air interface, and may communicate the traffic to UPF/PGW-U 1435, and/or one or more other devices or networks. Similarly, RAN 1410 may receive traffic intended for UE 105/107 (e.g., from UPF/PGW-U 1435, AMF 1415, and/or one or more other devices or networks) and may communicate the traffic to UE 105/107 via the air interface.

RAN 1412 may be, or may include, an LTE RAN that includes one or more base stations (e.g., one or more eNBs 1413), via which UE 105/107 may communicate with one or more other elements of environment 1400. In some embodiments, eNB 1413 may be an instance of base station 101. UE 105/107 may communicate with RAN 1412 via an air interface (e.g., as provided by eNB 1413). For instance, RAN 1410 may receive traffic (e.g., voice call traffic, data traffic, messaging traffic, signaling traffic, etc.) from UE 105/107 via the air interface, and may communicate the traffic to UPF/PGW-U 1435, and/or one or more other devices or networks. Similarly, RAN 1410 may receive traffic intended for UE 105/107 (e.g., from UPF/PGW-U 1435, SGW 1417, and/or one or more other devices or networks) and may communicate the traffic to UE 105/107 via the air interface.

PAC 103 may include one or more devices, systems, Virtualized Network Functions ("VNFs"), etc., that perform operations described herein, in accordance with some embodiments. For example, as discussed above, PAC 103 may communicate with RANs 1410 and 1412 (e.g., with gNB 1411 and/or eNB 1413) to cause RANs 1410 and/or 1412 to output system broadcast messages (e.g., SIBs) and/or RRC messages (e.g., release messages) based on the detection of an emergency event.

AMF 1415 may include one or more devices, systems, VNFs, etc., that perform operations to register UE 105/107 with the 5G network, to establish bearer channels associated with a session with UE 105/107, to hand off UE 105/107 from the 5G network to another network, to hand off UE 105/107 from the other network to the 5G network, manage mobility of UE 105/107 between RANs 1410 and/or gNBs 1411, and/or to perform other operations. In some embodiments, the 5G network may include multiple AMFs 1415, which communicate with each other via the N14 interface (denoted in FIG. 14 by the line marked "N14" originating and terminating at AMF 1415).

MME 1416 may include one or more devices, systems, VNFs, etc., that perform operations to register UE 105/107 with the EPC, to establish bearer channels associated with a session with UE 105/107, to hand off UE 105/107 from the EPC to another network, to hand off UE 105/107 from another network to the EPC, manage mobility of UE 105/107 between RANs 1412 and/or eNBs 1413, and/or to perform other operations.

SGW 1417 may include one or more devices, systems, VNFs, etc., that aggregate traffic received from one or more eNBs 1413 and send the aggregated traffic to an external network or device via UPF/PGW-U 1435. Additionally, SGW 1417 may aggregate traffic received from one or more UPF/PGW-Us 1435 and may send the aggregated traffic to one or more eNBs 1413. SGW 1417 may operate as an anchor for the user plane during inter-eNB handovers and as an anchor for mobility between different telecommunication networks or RANs (e.g., RANs 1410 and 1412).

SMF/PGW-C 1420 may include one or more devices, systems, VNFs, etc., that gather, process, store, and/or provide information in a manner described herein. SMF/PGW-C 1420 may, for example, facilitate in the establishment of communication sessions on behalf of UE 105/107. In some embodiments, the establishment of communications sessions may be performed in accordance with one or more policies provided by PCF/PCRF 1425.

PCF/PCRF 1425 may include one or more devices, systems, VNFs, etc., that aggregate information to and from the 5G network and/or other sources. PCF/PCRF 1425 may receive information regarding policies and/or subscriptions from one or more sources, such as subscriber databases and/or from one or more users (such as, for example, an administrator associated with PCF/PCRF 1425).

AF 1430 may include one or more devices, systems, VNFs, etc., that receive, store, and/or provide information that may be used in determining parameters (e.g., quality of service parameters, charging parameters, or the like) for certain applications.

UPF/PGW-U 1435 may include one or more devices, systems, VNFs, etc., that receive, store, and/or provide data (e.g., user plane data). For example, UPF/PGW-U 1435 may receive user plane data (e.g., voice call traffic, data traffic, etc.), destined for UE 105/107, from DN 1450, and may forward the user plane data toward UE 105/107 (e.g., via RAN 1410, SMF/PGW-C 1420, and/or one or more other devices). In some embodiments, multiple UPFs 1435 may be deployed (e.g., in different geographical locations), and the delivery of content to UE 105/107 may be coordinated via the N9 interface (e.g., as denoted in FIG. 14 by the line marked "N9" originating and terminating at UPF/PGW-U 1435). Similarly, UPF/PGW-U 1435 may receive traffic from UE 105/107 (e.g., via RAN 1410, SMF/PGW-C 1420, and/or one or more other devices), and may forward the traffic toward DN 1450. In some embodiments, UPF/PGW-U 1435 may communicate (e.g., via the N4 interface) with SMF/PGW-C 1420, regarding user plane data processed by UPF/PGW-U 1435.

HSS/UDM 1440 and AUSF 1445 may include one or more devices, systems, VNFs, etc., that manage, update, and/or store, in one or more memory devices associated with AUSF 1445 and/or HSS/UDM 1440, profile information associated with a subscriber. AUSF 1445 and/or HSS/UDM 1440 may perform authentication, authorization, and/or accounting operations associated with the subscriber and/or a communication session with UE 105/107.

DN 1450 may include one or more wired and/or wireless networks. For example, DN 1450 may include an Internet Protocol ("IP")-based PDN, a wide area network ("WAN") such as the Internet, a private enterprise network, and/or one or more other networks. UE 105/107 may communicate, through DN 1450, with data servers, other UEs 105/107, and/or to other servers or applications that are coupled to DN 1450. DN 1450 may be connected to one or more other networks, such as a public switched telephone network ("PSTN"), a public land mobile network ("PLMN"), and/or another network. DN 1450 may be connected to one or more devices, such as content providers, applications, web servers, and/or other devices, with which UE 105/107 may communicate.

Figure 15:
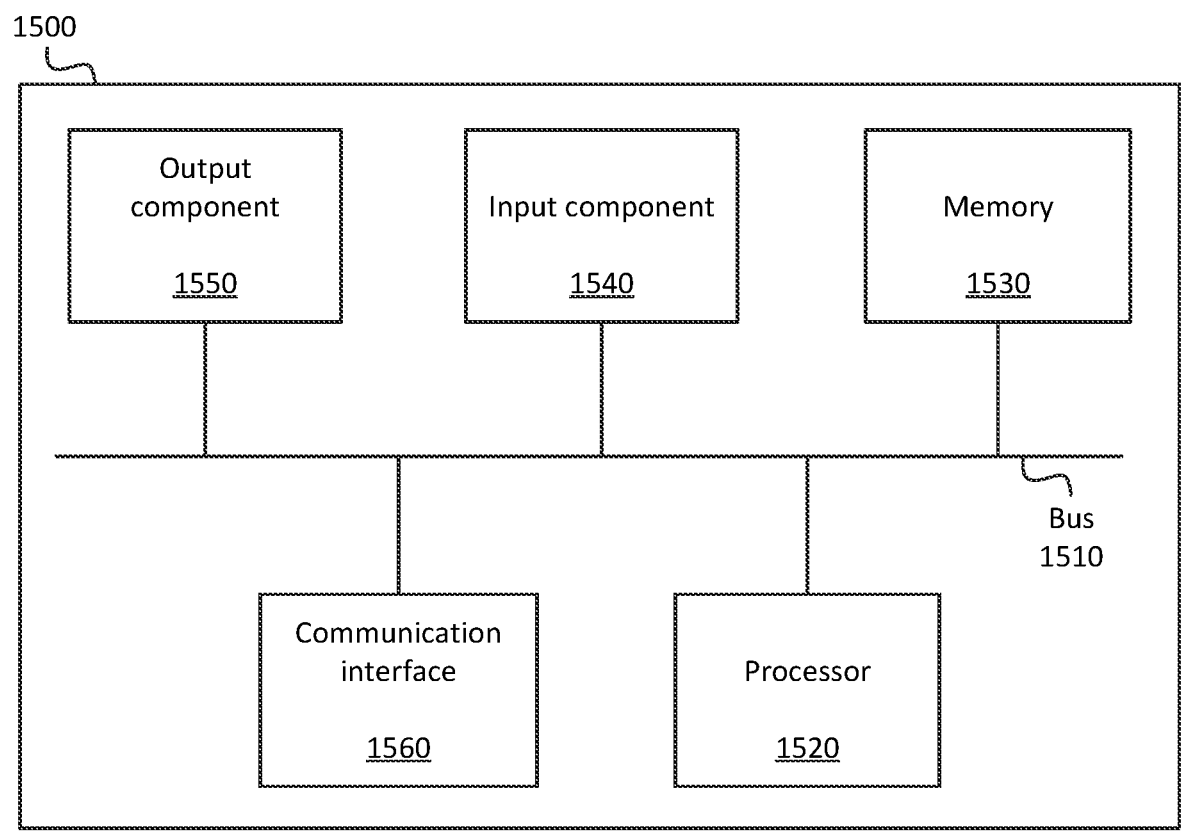
FIG. 15 illustrates example functional components of one or more devices, in accordance with one or more embodiments described herein.

FIG. 15 illustrates example components of device 1500. One or more of the devices described above may include one or more devices 1500. Device 1500 may include bus 1510, processor 1520, memory 1530, input component 1540, output component 1550, and communication interface 1560. In another implementation, device 1500 may include additional, fewer, different, or differently arranged components.

Bus 1510 may include one or more communication paths that permit communication among the components of device 1500. Processor 1520 may include a processor, microprocessor, or processing logic that may interpret and execute instructions. Memory 1530 may include any type of dynamic storage device that may store information and instructions for execution by processor 1520, and/or any type of non-volatile storage device that may store information for use by processor 1520.

Input component 1540 may include a mechanism that permits an operator to input information to device 1500, such as a keyboard, a keypad, a button, a switch, etc. Output component 1550 may include a mechanism that outputs information to the operator, such as a display, a speaker, one or more light emitting diodes ("LEDs"), etc.

Communication interface 1560 may include any transceiver-like mechanism that enables device 1500 to communicate with other devices and/or systems. For example, communication interface 1560 may include an Ethernet interface, an optical interface, a coaxial interface, or the like. Communication interface 1560 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1500 may include more than one communication interface 1560. For instance, device 1500 may include an optical interface and an Ethernet interface.

Device 1500 may perform certain operations relating to one or more processes described above. Device 1500 may perform these operations in response to processor 1520 executing software instructions stored in a computer-readable medium, such as memory 1530. A computer-readable medium may be defined as a non-transitory memory device. A memory device may include space within a single physical memory device or spread across multiple physical memory devices. The software instructions may be read into memory 1530 from another computer-readable medium or from another device. The software instructions stored in memory 1530 may cause processor 1520 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-7, 12, and 13), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
release one or more User Equipment ("UEs"), that are associated with a first access level, from a particular cell associated with a radio access network ("RAN") of a wireless network, wherein releasing the one or more UEs includes:
determining that a first communication session, associated with a first UE, is a non-emergency communication session,
releasing the first UE based on determining that the first communication session is a non-emergency communication session,
determining that a second UE associated with the first access level is engaged in an emergency communication session, and
forgoing releasing the second UE based on determining that the second UE is engaged in an emergency communication session; and
broadcast a particular system broadcast message indicating that the particular cell is accessible by UEs associated with a second access level, wherein one or more UEs that are associated with the second access level connect to the particular cell based on the particular system broadcast message.

2. The device of claim 1, wherein the releasing and broadcasting are performed based on receiving an indication of an occurrence of a particular triggering event.

3. The device of claim 1, wherein the particular system broadcast message is a second system broadcast message that is broadcasted after broadcasting a first system broadcast message, wherein the one or more UEs, that are associated with the first access level, connect to the particular cell based on the first system broadcast message.

4. A device, comprising:
one or more processors configured to:
release one or more User Equipment ("UEs"), that are associated with a first access level, from a first cell associated with a radio access network ("RAN") of a wireless network; and
broadcast a particular system broadcast message indicating that the particular cell is accessible by UEs associated with a second access level,
wherein one or more UEs that are associated with the second access level connect to the particular cell based on the particular system broadcast message,
wherein the one or more UEs, that are associated with the first access level, connect to a different second cell of the RAN of the wireless network after being released from the first cell,
wherein the second cell does not broadcast a system broadcast message indicating that the second cell is only accessible by UEs associated with the second access level.

5. The device of claim 4, wherein the particular system broadcast message is a first system broadcast message, wherein the second cell broadcasts a second system broadcast message indicating that the second cell is accessible by UEs associated with the first access level.

6. The device of claim 4, wherein the releasing and broadcasting are performed based on receiving an indication of an occurrence of a particular triggering event.

7. The device of claim 4, wherein the particular system broadcast message is a second system broadcast message that is broadcasted after broadcasting a first system broadcast message,
wherein the one or more UEs, that are associated with the first access level, connect to the particular cell based on the first system broadcast message.

8. A non-transitory computer-readable medium, storing a plurality of processor-executable instructions to:
release one or more User Equipment ("UEs"), that are associated with a first access level, from a particular cell associated with a radio access network ("RAN") of a wireless network, wherein releasing the one or more UEs includes:
determining that a first communication session, associated with a first UE, is a non-emergency communication session,
releasing the first UE based on determining that the first communication session is a non-emergency communication session,
determining that a second UE associated with the first access level is engaged in an emergency communication session, and
forgoing releasing the second UE based on determining that the second UE is engaged in an emergency communication session; and
broadcast a particular system broadcast message indicating that the particular cell is accessible by UEs associated with a second access level, wherein one or more UEs that are associated with the second access level connect to the particular cell based on the particular system broadcast message.

9. The non-transitory computer-readable medium of claim 8, wherein the releasing and broadcasting are performed based on receiving an indication of an occurrence of a particular triggering event.

10. The non-transitory computer-readable medium of claim 8, wherein the particular system broadcast message is a second system broadcast message that is broadcasted after broadcasting a first system broadcast message,
wherein the one or more UEs, that are associated with the first access level, connect to the particular cell based on the first system broadcast message.

11. A non-transitory computer-readable medium, storing a plurality of processor-executable instructions to:
release one or more User Equipment ("UEs"), that are associated with a first access level, from a first cell associated with a radio access network ("RAN") of a wireless network; and
broadcast a particular system broadcast message indicating that the particular cell is accessible by UEs associated with a second access level,
wherein one or more UEs that are associated with the second access level connect to the particular cell based on the particular system broadcast message,
wherein the one or more UEs, that are associated with the first access level, connect to a different second cell of the RAN of the wireless network after being released from the first cell,
wherein the second cell does not broadcast a system broadcast message indicating that the second cell is only accessible by UEs associated with the second access level.

12. The non-transitory computer-readable medium of claim 11, wherein the particular system broadcast message is a first system broadcast message, wherein the second cell broadcasts a second system broadcast message indicating that the second cell is accessible by UEs associated with the first access level.

13. The non-transitory computer-readable medium of claim 11, wherein the particular system broadcast message is a second system broadcast message that is broadcasted after broadcasting a first system broadcast message,
wherein the one or more UEs, that are associated with the first access level, connect to the particular cell based on the first system broadcast message.

14. A method, comprising:
releasing one or more User Equipment ("UEs"), that are associated with a first access level, from a particular cell associated with a radio access network ("RAN") of a wireless network, wherein releasing the one or more UEs includes:
determining that a first communication session, associated with a first UE, is a non-emergency communication session,
releasing the first UE based on determining that the first communication session is a non-emergency communication session,
determining that a second UE associated with the first access level is engaged in an emergency communication session, and
forgoing releasing the second UE based on determining that the second UE is engaged in an emergency communication session; and
broadcasting a particular system broadcast message indicating that the particular cell is accessible by UEs associated with a second access level, wherein one or more UEs that are associated with the second access level connect to the particular cell based on the particular system broadcast message.

15. The method of claim 14, wherein the releasing and broadcasting are performed based on receiving an indication of an occurrence of a particular triggering event.

16. The method of claim 14, wherein the particular system broadcast message is a second system broadcast message that is broadcasted after broadcasting a first system broadcast message, wherein the one or more UEs, that are associated with the first access level, connect to the particular cell based on the first system broadcast message.

17. A method, comprising:

releasing one or more User Equipment ("UEs"), that are associated with a first access level, from a first cell associated with a radio access network ("RAN") of a wireless network; and broadcasting a particular system broadcast message indicating that the particular cell is accessible by UEs associated with a second access level, wherein one or more UEs that are associated with the second access level connect to the particular cell based on the particular system broadcast message, wherein the one or more UEs, that are associated with the first access level, connect to a different second cell of the RAN of the wireless network after being released from the first cell, wherein the second cell does not broadcast a system broadcast message indicating that the second cell is only accessible by UEs associated with the second access level.

18. The method of claim 17, wherein the particular system broadcast message is a first system broadcast message, wherein the second cell broadcasts a second system broadcast message indicating that the second cell is accessible by UEs associated with the first access level.

19. The method of claim 17, wherein the releasing and broadcasting are performed based on receiving an indication of an occurrence of a particular triggering event.

20. The method of claim 17, wherein the particular system broadcast message is a second system broadcast message that is broadcasted after broadcasting a first system broadcast message, wherein the one or more UEs, that are associated with the first access level, connect to the particular cell based on the first system broadcast message.

\* \* \* \* \*